3,345,184
METHOD OF FORMULATING FROZEN DESSERT
Frank Sam Nelson, 1207 S. Industrial,
Dallas, Tex. 75207
No Drawing. Filed Feb. 3, 1964, Ser. No. 342,277
4 Claims. (Cl. 99—136)

ABSTRACT OF THE DISCLOSURE

Methods of formulating dry frozen dessert mixes wherein sugar, flavoring, liquid unsaturated food oil, non-fat dry skimmed milk and a stabilizer are dry-blended in given proportions for given times.

---

This invention relates to new and useful improvements in compositions for the preparation of frozen desserts and methods of formulating the same.

The invention is directed in particular to methods of formulating dry or powderlike mixes, and to the mixes themselves, from which frozen desserts and the like may readily be prepared by the simple addition of water and agitation of the mixture under cold temperatures.

It is now accepted that the accumulation or deposit in the human circulatory system of cholesterol or materials resulting from the bodily intake of foods and other materials containing cholesterol or leading to its formation is at least partially responsible for many heart ailments and heart conditions which might otherwise be avoided. Accordingly, it has become the practice to place human beings suffering from such a heart condition on a diet as free of cholesterol or cholesterol-forming materials as possible, and even to augment the diet with materials or substances which tend to diminish the already existing deposits of cholesterol or materials resulting from intake of cholesterol-forming matter.

The present invention relates to frozen dessert mixes, and the methods of preparation thereof, which are not only free of cholesterol or cholesterol-producing ingredients, but also include an ingredient tending to reduce the already deposited accumulations of cholesterol or related materials. It is, therefore, one object of this invention to provide an improved frozen dessert mix and a method of formulating the same to produce a product which will not add to any cholesterol or related deposits in the human body, and especially the circulatory system thereof, while at the same time retaining all of the desirable qualities of such dessert mixes, such as flavor, consistency, and appeal to the appetite.

An important object of the invention is to provide an improved frozen dessert mix, and methods of formulating such a mix, which does not include any unsaturated fats and which contains as substantially the only fat ingredient an unsaturated oil such as corn oil.

Yet another object of the invention is to provide an improved method of formulating a frozen dessert mix containing an unsaturated oil such as corn oil with which the ingredients may properly be combined into a homogeneous and stable product having very good keeping qualities but readily mixable with water for production of the final frozen dessert.

Still another object of the invention is to provide an improved frozen dessert mix which, when utilized in preparation of a frozen dessert, results in a product indistinguishable in taste, consistency, and appeal to the appetite, from other similar desserts, but which is free of saturated oils such as butterfat, cottonseed oil and the like, and which contains as substantially its only fat ingredient an unsaturated oil such as corn oil.

Other and more particular objects will be apparent from a reading of the following description and the claims appended thereto.

Compositions for carrying out the invention will be hereinafter described, together with other features of the invention.

The invention will be more readily understood from a reading of the following specification and by reference to the claims appended hereto.

A frozen dessert mix made in accordance with this invention contains a number of conventional ingredients, and quite obviously, the proportions of such ingredients may be varied to vary the sweetness, the density, the consistency, the flavor, and the keeping qualities of the resultant mix. There may also be variations in color and shade, but primarily the variation will be in the quantities of sugar, salt, and flavoring employed since these three ingredients most markedly affect the taste of the final product and its appeal to the appetite.

The ingredients which are employed, and which may be varied in more or less conventional fashions, include ordinary granulated sugar or sucrose, corn sugar or glucose, a suitable stabilizer such as finely ground cellulose gum stabilizer, ordinary table salt or sodium chloride, a suitable flavoring material, dry non-fat skimmed milk, corn oil, and a quantity of coloring materials such as any of the well-known certified food colors, and which is added in any form but most desirably in a powdered form.

The equipment for formulating the mix is very simple and consists only of a conventional blending machine of whatever size desired and as required for the size of the batch of mix to be made, these blending machines consisting essentially of a large drum within which blades are revolved at about 200 revolutions per minute.

In formulating the frozen dessert mix, both the ordinary granulated sugar and the corn sugar are placed in the blender and the blades of the blender are started revolving. The coloring material is added immediately, desirably in the form of a powder, and the blending operation continued for at least 5 minutes.

The flavoring material which normally is in the form of a liquid, is then added and the agitation or blending continued for at least 10 minutes but desirably not more than 15 minutes.

The unsaturated oil, such as corn oil, is then added and the blending is continued for at least 20 minutes. Continuing the blending, the dry or powdered non-fat skimmed milk is added and the stabilizing material.

After all of the ingredients have been added, the blending operation is continued for at least 20 minutes to produce a thoroughly admixed dry frozen dessert mix which may then be transferred to containers of suitable sizes, and which will be stable in storage for at least six months. It has been found desirable to fill the container with an inert gas such as nitrogen although other inert gases may be employed.

In preparing a frozen dessert from this product, the proper quantity of water is placed in a mixer and agitation thereof is started. The speed of agitation within reasonable limits is relatively unimportant and is conventional. The dry mix is then added to the water in the mixer with the agitation being continued until a thorough mix has been obtained, after which the material is frozen in the normal and usual fashion.

As a specific example of the quantities of ingredients which may be employed, the following formula has been found quite suitable and to produce a frozen dessert of almost universal appeal:

| Ingredient | Unit | Amount |
|---|---|---|
| Ordinary granulated sugar (sucrose) | lbs | 200 |
| Corn sugar (glucose) | lbs | 73 |
| Stabilizer (finely ground cellulose gum stabilizer) | lbs | 10.5 |
| Table salt (sodium chloride) | ozs | 22 |
| Flavoring, vanilla (varied to taste) | ozs | 36 |
| Dry non-fat skimmed milk | lbs | 336 |
| Food coloring (varies with color and shade) | oz | ½ |

Corn oil, sufficient to give a corn oil content of 6–8% in the final product, a frozen dessert mix The table salt may be added to the mixture at any time just as it may be added when desired in the blending operation as above described.

The resultant product or frozen dessert mix may be packaged in suitable quantities, such as in waterproof bags in quantities of 7 lbs. each, and each bag of such product may be combined with two gallons of water to form the dessert mix which is then frozen. Utilizing the above formula, each 7 lb. bag will product 368 ozs. of frozen dessert.

As a further example of a suitable composition of a dry frozen dessert mix, and one which is subject as indicated to considerable variation, the mix may contain from 35–50% sugar, flavoring in suitable or desirable quantities, 6–8% corn oil, 45–55% non-fat dry skimmed milk, 1–2 parts of a suitable stabilizer, and salt and coloring as may be found desirable or necessary. Desirably, the sugar content consists of 25–35% granulated sugar or sucrose and 10–15% corn sugar or glucose.

As a still further and more specific example, the mix may contain about 41% sugar, about 1.5% of a stabilizer, about 49% non-fat dry skimmed milk, about 8% corn oil, and flavoring and coloring, along with salt, as indicated in accordance with conventional formulation practices to produce a product of the desired taste, appearance, and other physical and chemical properties. Here again, the sugar content is desirably formed of about 30% granulated sugar or sucrose, and about 11% corn sugar or glucose.

As stated above, the table salt may be added at any point during the blending operation but should, of course, be added prior to the final blending step.

In nearly every instance, and even in the case of a more or less colorless mix such as that required for a vanilla flavor, some quantity of coloring material may be added, and as noted above, this coloring material is first added to the sugar and a short period of blending carried out. In the event no coloring material is employed, this first blending step may be omitted and the flavoring material added at once with blending taking place for 10 to 15 minutes, followed by the remaining additions and blending steps as above described.

Quite apparently, there are many variations not only in the ingredients of frozen dessert mixes, but also in the quantities thereof utilized in each formulation, and the present invention is subject to such conventional variations. The essential and critical part of the invention is the elimination from the frozen dessert mix of all fats other than the unsaturated fat, corn oil, along with the method of formulating the mix which has been found critical to ensure the proper and desired results.

Corn oil has a high content of unsaturated fatty acids and consists to a large degree of glycerides of oleic acid and linoleic acid, which accounts for its employment in cases of hypercholesterolemia. For the same reason, it is of value in the present frozen dessert mix, not only because of the elimination to a great extent of cholesterol deposits in the circulatory system of a human being, but also because of its possible aid in reducing the extent of such deposits which may have already occurred.

The product is not viewed as being medicinal in nature, but rather, is viewed as a product which has been freed of ingredients which are objectionable in some instances as far as human health is concerned and yet which retains all the desirable qualities, such as flavor, appearance, aroma and the like, of conventional frozen dessert products.

If desired, quantities of butterfat can be added to the dessert mix, for instance 4 to 5% by weight of the dry ingredients may be added to the mix when the liquid components are added to formulate the dessert composition. Of course, any desired final butter fat content, such as 2 to 3% of the frozen dessert by weight, may be utilized, and the butter fat may be added in any of the several commercially available forms.

Various alterations in the ingredients and the proportions thereof may be made within the scope of the appended claims without departure from the spirit of the invention.

What I claim and desire to secure by Letters Patent is:

1. The method of formulating a dry frozen dessert mix of 100 parts by weight including, dry-blending flavoring and 35 to 50 parts sugar by blending them for 10–15 minutes, then adding 6 to 8 parts of a liquid unsaturated food oil and continuing the blending for at least 20 minutes, then adding 45 to 55 parts non-fat dry skimmed milk while continuing the blending, then adding 1 to 2 parts of a stabilizer while continuing the blending, and continuing the blending for at least 20 minutes after the stabilizer has been added.

2. The method of formulating a dry frozen dessert mix of 100 parts by weight including, dry-blending 35 to 50 parts sugar with a food coloring material and blending them for at least 5 minutes, then adding a flavoring material and continuing the blending for 10 to 15 minutes, then adding 6 to 8 parts of a liquid unsaturated food oil and continuing the blending for at least 20 minutes, then adding 45 to 55 parts non-fat dry skimmed milk while continuing the blending, then adding 1 to 2 parts of a stabilizer while continuing the blending, and continuing the blending for at least 20 minutes after the stabilizer has been added.

3. The method as set forth in claim 2, and adding a small quantity of table salt to the mix during the blending operation prior to the last blending step.

4. The method of formulating a dry frozen dessert mix of 100 parts by weight including, dry-blending about 30 parts sucrose and 11 parts glucose with flavoring to taste by blending the aforesaid ingredients for 10 to 15 minutes, then adding 6 to 8 parts of a liquid unsaturated food oil and continuing the blending for at least 20 minutes, then adding 45 to 55 parts non-fat dry skimmed milk while continuing the blending, then adding 1 to 2 parts of a stabilizer while continuing the blending, and continuing the blending for a least 20 minutes after the stabilizer has been added.

References Cited

UNITED STATES PATENTS

| | | | | |
|---|---|---|---|---|
| 3,183,098 | 5/1965 | Baur | | 99—136 |
| 3,203,862 | 8/1965 | Jones | | 99—118 |

A. LOUIS MONACELL, *Primary Examiner.*

J. M. HUNTER, *Assistant Examiner.*